United States Patent [19]
Hook et al.

[11] 3,757,928
[45] Sept. 11, 1973

[54] AUGER CONVEYOR

[75] Inventors: Richard Wayne Hook; Richard David Zaun, both of Des Moines, Iowa

[73] Assignee: Deere & Company, Moline, Ill.

[22] Filed: Dec. 17, 1971

[21] Appl. No.: 209,116

[52] U.S. Cl. ............................... 198/160, 198/104
[51] Int. Cl. ........................................... B65g 15/14
[58] Field of Search .................. 198/229, 188, 104, 198/171, 213, 136; 418/4

[56] References Cited
UNITED STATES PATENTS
944,581 12/1909 Stevens .................................. 418/4
2,758,728 8/1956 Henry ................................. 198/188

FOREIGN PATENTS OR APPLICATIONS
35,642 9/1911 Sweden .................................. 37/82

Primary Examiner—Richard E. Aegerter
Attorney—H. Vincent Harsha et al.

[57] ABSTRACT

A generally upright auger conveyor is illustrated as part of a beet harvester and includes an endless chain carrying a plurality of paddles which extend into the confines of the helical flight of the auger. Engagement between the paddles and helical flight drives the endless chain so that the paddles are advanced by the helical flight. The paddles prevent material advanced by the helical flight from gravitating down the helical flight and thereby increase the efficiency of the auger conveyor.

20 Claims, 3 Drawing Figures

Patented Sept. 11, 1973

INVENTORS
R. W. HOOK
R. D. ZAUN

BY
R L Hollister

ATTORNEY

INVENTORS
R. W. HOOK
R. D. ZAUN

BY R L Hollister

ATTORNEY 3,757,928

AUGER CONVEYOR

BACKGROUND OF THE INVENTION

The present invention relates generally to conveyors, and more particularly relates to auger conveyors for elevating materials.

Auger conveyors are most efficient when working at or near the horizontal and have a decrease in efficiency as they approach the vertical since there is insufficient friction between the material and the auger housing to prevent the material from gravitating down the helical flight. If an auger conveyor was used at or near the vertical position, it has always been necessary to force feed the auger conveyor so that the material entering the auger conveyor would prevent other material from gravitating down the helical flight.

The force feeding of an auger conveyor consumes considerable power and will excessively damage some materials. Therefore, auger conveyors were seldom used when material was to be elevated substantially vertically.

SUMMARY OF THE INVENTION

The principal object of the present invention is to provide an auger conveyor of increased efficiency when working at an angle to the horizontal.

Another object of the present invention is to provide an auger conveyor which does not require force feeding when working at a substantial angle to the horizontal.

Still another object of the present invention is to provide an improved auger conveyor which includes means to prevent material from gravitating down the helical flight of the auger when working at a substantial angle to the horizontal.

A further object of the present invention is to provide an auger conveyor which will move frangible materials at a substantial angle to the horizontal without causing excessive damage.

Yet another object of the present invention is to provide an improved auger conveyor which includes a plurality of paddles extending between spaced apart portions of the auger flight to prevent material from gravitating down the auger flight when the auger conveyor is used at a substantial angle to the horizontal.

The above objects and additional objects and advantages of the present invention will become apparent, along with the details of construction of a preferred embodiment of the invention, to those skilled in the art from a reading of the following detailed description when taken in conjunction with the accompanying drawings.

DESCRIPTION OF THE PREFERRED EMBODIMENT

Figure 1:
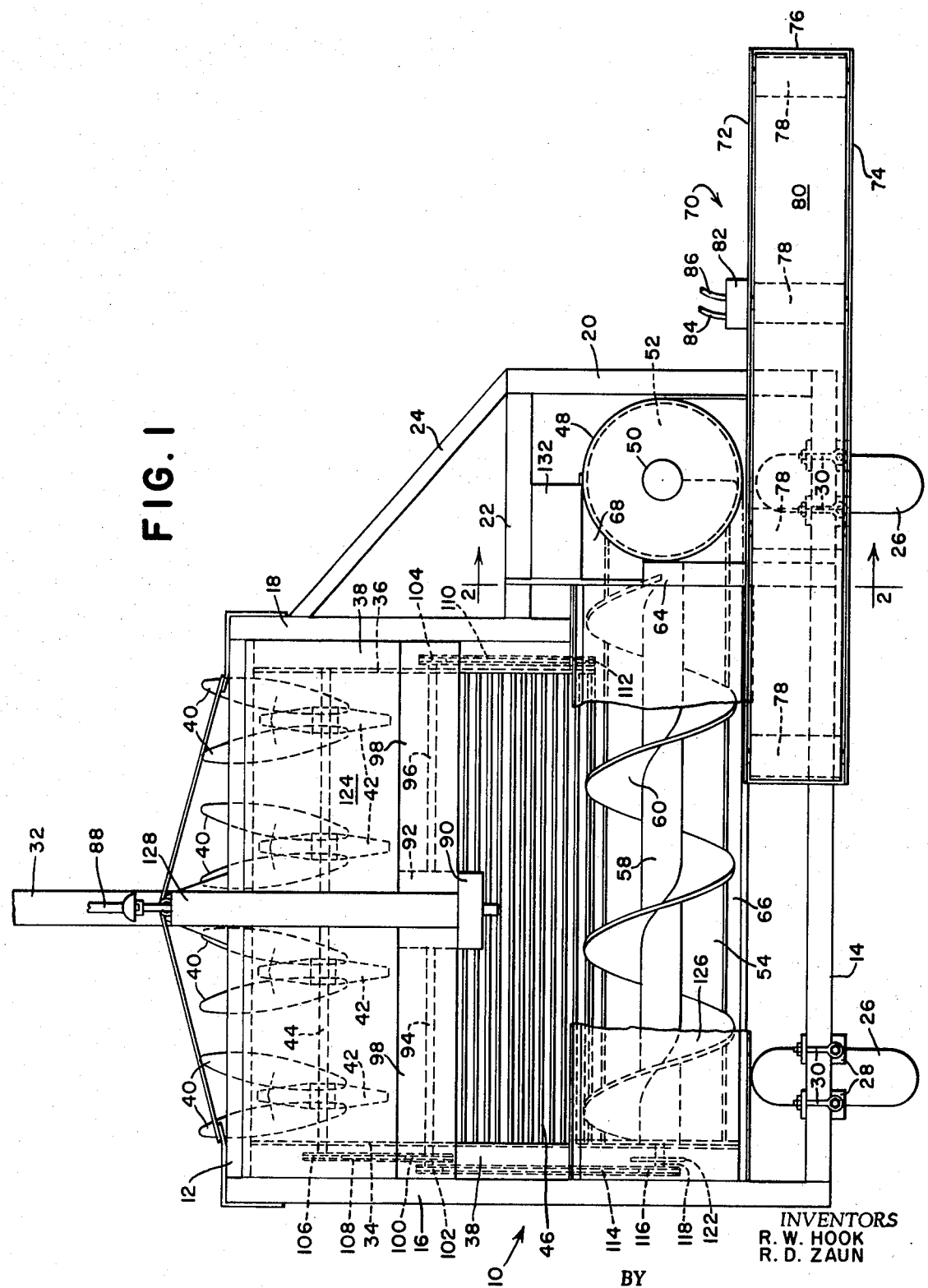
FIG. 1 is a top plan view of a beet harvester embodying an auger conveyor according to the present invention.

The auger conveyor according to the present invention is illustrated in the drawings as being part of a beet harvester indicated generally by the numeral 10. The beet harvester is of the type illustrated in copending U.S. applications Ser. Nos. 209,123 and 209,124, both filed concurrently herewith, and includes a front frame member 12, a rear frame member 14, a left side frame member 16, front and rear laterally offset right side frame members 18 and 20, an intermediate frame member 22 interconnecting the right side frame members, and a diagonal brace member 24 extending between the front and rear right side frame members.

The rear portion of the main frame is supported by a pair of wheels 26 journaled on the lower end of supports 28 which have their upper ends secured to the rear frame member 14 by clamp assemblies 30. The forward end of the main frame is supported by a forwardly extending hitch 32 which is adapted to be connected to a tractor drawbar (undisclosed). A pair of support plates 34 and 36 depend from the left- and right-hand sides, respectively, of the main frame and each is spaced inwardly from its respective frame bar. Each of the support plates 34 and 36 is provided with an upper horizontal flange portion 38 which projects towards the respective side frame member and is secured thereto in any suitable manner.

A plurality of digger wheel assemblies are secured to the front frame member 12 in spaced relation to each other and each includes a pair of lifter wheels 40 and an ejector paddle 42. The lifter wheels 40 are secured to the front frame member 12 in a manner fully disclosed in the above-mentioned copending applications and the ejector paddles are mounted on a cross shaft 44 to be driven thereby. A chain conveyor or potato chain 46 is carried by the support plates 34 and 36 directly behind the digger wheel assemblies to receive beets from the digger wheel assemblies and convey the same upwardly and rearwardly.

The upright or vertical auger conveyor according to the present invention is supported on the right-hand side of the main frame between the rear frame member 14 and the intermediate frame member 22, and includes an elongated cylindrical housing 48. The auger housing 48 is closed at both ends, but has a laterally directed opening adjacent its lower end as can best be seen in FIG. 2 and a rearwardly directed opening adjacent its upper end. An auger including a core 50 and a helical flight 52 secured to the core is journaled within the housing to elevate beets from the lower opening in the housing to the upper opening in the housing. The upright or vertical auger conveyor includes additional structure, but this additional structure will be described hereinafter since only the basic parts of the vertical auger conveyor are necessary to understand its operation in the beet harvester.

A sheet metal trough 54 extends between the support plate 34 and the laterally directed opening in the lower portion of the auger housing 48. The end of the trough 54 adjacent the opening in the housing 48 is provided with a downwardly depending flange 56 which is secured to the bottom wall 49 of the auger housing 48 to provide support for the trough 54.

A cross auger having a core 58 and a helical flight 60 secured to the core is mounted for rotation within the trough 54. One end of the cross auger is journaled in the support plate 34 and the other end is journaled in a bracket 62 depending from a crossbar 64 which extends between and is secured to the intermediate frame member 22 and the rear frame member 14. An arcuate shield 66 directly behind the cross auger extends between the support plate 34 and the auger housing 48 to form a continuation of the trough for the cross auger. The trough 54 and cross auger extend laterally beyond the right side of the potato chain 46 and an arcuate shield 68 directly in front of the cross auger extends between the support plate 36 and the housing 48 to form a front continuation of the trough for the cross auger.

An upper conveyor indicated generally at 70 is secured to the rear of and adjacent the upper end of the vertical auger conveyor in beet-receiving relationship to the opening in the upper end of the housing 48 and includes side walls 72 and 74 and a bottom wall 76. For a description of how the upper conveyor is supported on the vertical auger conveyor, reference can be had to the above-mentioned copending applications Ser. Nos. 209,123 and 209,124. A plurality of rollers 78 are journaled between the side walls 72 and 74 and an endless belt or potato chain 80 is trained about the rollers. A hydraulic motor 82 is secured to the side wall 72 and is connected to one of the rollers 78 to drive the endless belt 80. A pair of hydraulic lines 84 and 86 extend from the motor 82 and are adapted to be connected to the conventional hydraulic system on the tractor to which the beet harvester is coupled. The conveyor 70 extends both laterally inwardly and laterally outwardly from the vertical auger conveyor, but this feature is unimportant as far as the present invention is concerned, but for an understanding of why the upper conveyor 70 extends in both directions, reference can be had to the above-mentioned copending U. S. application Ser. No. 209,123.

The drive train for the driven components of the harvester, with the exception of the conveyor 70, includes a main drive line 88 which is adapted to have its forward end connected to the conventional power take-off of the propelling tractor and which has its rearward end supported in a transfer box 90. A sprocket and chain assembly in the transfer box 90 transmits power from the main drive line to a gear box 92 which drives oppositely extending shafts 94 and 96 in opposite directions. The shaft 94 is driven in a counterclockwise direction as viewed from the left, and the shaft 96 is driven in a clockwise direction as viewed from the left. The shafts 94 and 96 project through and are journaled in the support plates 34 and 36 and are covered by a shield 98. A pair of sprocket wheels 100 and 102 are keyed to the outer end of the shaft 94 and a sprocket wheel 104 is keyed to the outer end of the shaft 96.

The sprocket wheel 100 on the end of the shaft 94 is interconnected with a sprocket wheel 106 on the left-hand end of the shaft 44 for the ejector paddles 42 by a chain 108. A drive chain 110 is trained about the sprocket wheel 104 on the shaft 96 and about a sprocket wheel 112 on the upper shaft for the potato chain 46 to drive the potato chain 46.

A drive chain 114 is trained about the sprocket wheel 102 on the outer end of the shaft 94 and about a sprocket wheel 116 on the left-hand end of a cross shaft 118. The cross shaft 118 has its left-hand end journaled in the lower end of the support plate 34 and its right-hand end connected to the input of a right-angle gear box 120 secured to the bottom wall 49 of the auger housing 48. The output shaft of the right-angle gear box 120 is connected to the lower end of the core 50 for the vertical auger.

An additional sprocket wheel (undisclosed) mounted on the left-hand end of the cross shaft 118 is interconnected with a sprocket wheel 122 secured to the left-hand end of the core 58 for the cross auger by a drive chain (undisclosed). By having the cross auger and vertical auger driven from the common shaft 118, the two augers remain properly timed for efficient transfer of beets from one auger to the other.

To provide shielding for some of the moving parts and to enhance the appearance of the harvester, a cover shield 124 is mounted on the main frame over the digger wheel assemblies, a cover 126 is mounted on the main frame over the cross auger, and a shield 128 is provided for the main drive line 88.

The operation of the beet harvester above-described is essentially the same as the operation of the beet harvesters illustrated and described in the above-mentioned copending U. S. applications Ser. Nos. 209,123 and 209,124, and reference can be had to these applications for a complete understanding of its operation.

Figure 2:
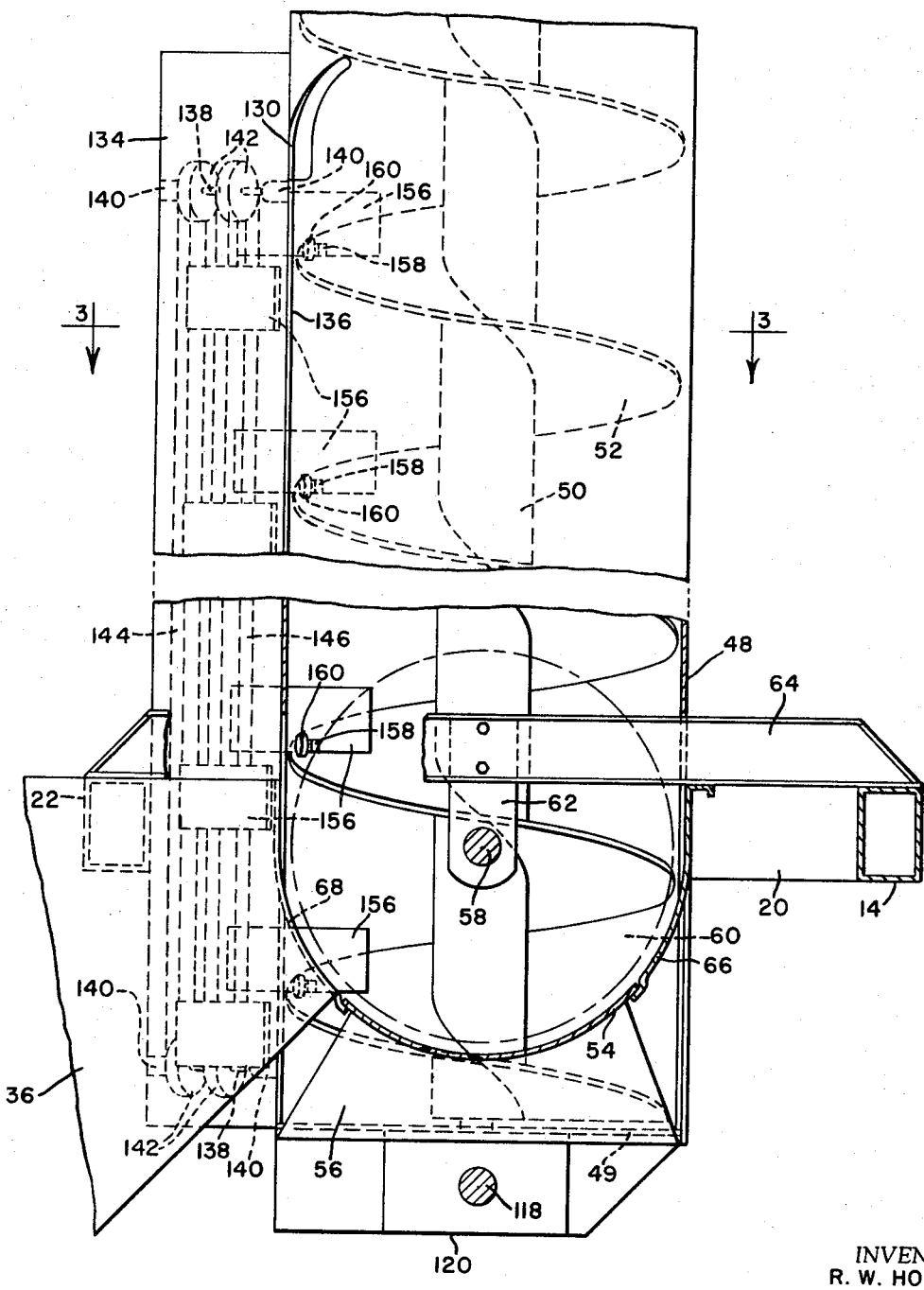
FIG. 2 is a view taken substantially along the line 2—2 of FIG. 1.
Figure 3:
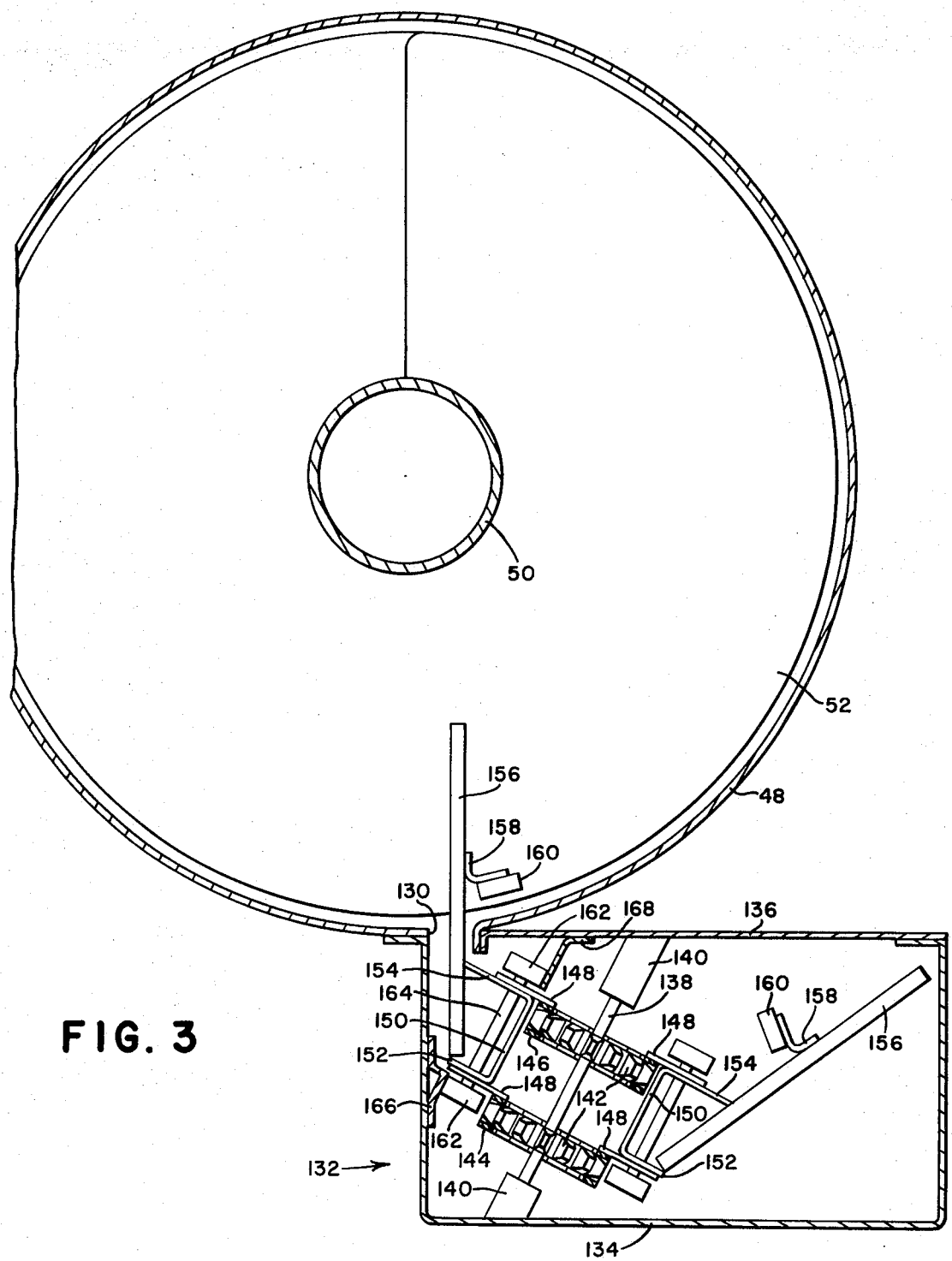
FIG. 3 is a view taken substantially along the line 3—3 of FIG. 2.

The improved auger conveyor according to the present invention is illustrated in FIGS. 2 and 3. As can be seen, the auger housing 48 is provided with an elongated opening 130 which extends from the laterally directed opening adjacent the lower end thereof upwardly along a portion of the length of the auger conveyor. A generally rectangular secondary housing 132 is secured to the auger housing 48 and extends from near the bottom wall of the auger housing to near the upper end of the elongated opening 130 provided in the auger housing. The secondary housing 132 includes a generally U-shaped section 134 which has one of its legs secured to the auger housing 48 near one edge of the opening 130 and a plate portion 136 extending between the second leg of the U-shaped portion 134 and the second edge of the elongated opening 130 provided in the auger housing 48.

A pair of upper and lower shafts 138 are journaled in bearing blocks 140 secured to the bight of the U-shaped portion 134 of the secondary housing and the plate 136. The bearing blocks 140 are offset from each other in the direction of the major dimension of the secondary housing 132 so that the shafts 138 are positioned at an angle with respect to all four sides of the secondary housing. A pair of sprocket wheels 142 are mounted on and keyed to each of the shafts 138 in spaced apart relationship to each other and a pair of outer and inner chains 144 and 146 are trained about the sprocket wheels 142 so that each chain presents a drive and return flight extending between the upper and lower sprocket wheels.

A plurality of mounting arms 148 are secured to corresponding links of the chains 144 and 146 and the mounting arms on each chain are spaced from each other a distance equal to the pitch of helical flight 52. A generally U-shaped bracket member 150 is positioned between each pair of corresponding mounting arms 148 and the legs of each U-shaped bracket are secured to the respective pair of mounting arms 148. The leg 152 of each of the brackets 150 which is connected to the mounting arm secured to the chain 144 is shorter than the leg 154 which is connected to the mounting arm secured to the chain 146. A plurality of flat, generally elongated and substantially rigid plate-like paddle members 156 each have one end secured to the leg 152 of one of the U-shaped brackets 150 and an intermediate portion secured to the corresponding leg 154 of one of the brackets 150. The paddle members 156 are secured to the legs 152 and 154 of the U-shaped bracket members 150 so that when the bracket members 150 are on either the return or drive flights of the chains 144 and 146, they lie in planes substantially parallel to the axis of rotation of the auger. The paddles 156 on the drive flight of the chains 144 and 146 extend generally parallel to the short sides of the generally rectangular-shaped secondary housing 132, through the elongated opening 130 provided in the auger housing 44 and within the confines of the helical flight 52. Because of the positioning of the shafts 138 and the unequal lengths of the legs 152 and 154 of the U-shaped bracket members 150, the paddle members 156 on the return flight of the chains 144 and 146 are contained wholly within the secondary housing 132.

A bracket 158 is secured to each of the paddles 156 and serves to mount a small drive roller 160 which extends slightly below its respective paddle member when its respective paddle member is on the drive flight of the chains 144 and 146 so that upon rotation of the auger the leading face of the helical flight 52 engages the rollers 160 and drives the paddle members 156 on the drive flight of the chains 144 and 146 in the direction of material movement through the auger conveyor. The upper end of the elongated opening 130 is enlarged and curved in the direction of paddle movement over the upper sprocket wheels 142 and the plate member 136 of the secondary housing 132 terminates short of the ends of the secondary housing so the paddle members 156 can make the transition from the auger housing 48 to the secondary housing 132 as they move over the upper sprockets 142 and from the secondary housing 132 to the auger housing 48 as they move under the lower sprocket wheels 142.

The pitch of the bottommost portion of the flight 52 is greater than the pitch of the rest of the flight and the pitch of the flight in the area just prior to the area where the paddles leave the housing is slightly less than the pitch of the majority of the flight to prevent any binding or interference between the paddles and flight as the paddles make the transition between the auger housing and secondary housing.

By having the two chains 144 and 146 guided by the timed sprocket wheels, the sprocket wheels being keyed to their respective shafts 138, and by securing each of the paddle members 156 to both chains 144 and 148 through the legs 152 and 154 of the U-shaped bracket members 150, the resistance of the paddles and chains to being driven by the leading face of the helical flight 52 will not b able to deflect the outer end of the paddle members 156 on the drive flights of the chains 144 and 146 in the direction of material movement through the auger housing.

The tendency of the material or beets in the auger housing 48 to travel around the housing 48 with the helical flight 52 and also the tendency of the material to gravitate down the helical flight will provide a substantial force against each of the paddle members 156 on the drive flights of the chains 144 and 146, but this force is taken up by a pair of thrust rollers 162. A shaft 164 extends through each pair of mounting arms 148 and a pair of the thrust rollers 162 are mounted on the ends of each shaft 164. A pair of tracks 166 and 168 for the thrust rollers 162 are mounted on the leg of the U-shaped portion of the housing 132 which is secured to the auger housing 48 and on the plate member 136 of the housing 132, respectively, so that the rollers 162 for the paddle members 156 on the drive flight of the chains 144 and 146 engage and move along the tracks 166 and 168 and resist any twisting movement of the paddles 156 which would be caused by the force of the material against the paddles 156.

The operation of the auger conveyor according to the present invention is substantially as follows. As beets are moved from the trough 54 into the opening provided in the lower end of the housing 48 by the cross auger, they will be picked up by the flight 52 on the vertical auger. Since the auger housing 48 is substantially vertical there will be little resistance to movement of the beet around the housing 48 with the helical flight 52. However, as the beets move around the housing 48, they will contact and their movement about the housing 48 will be stopped by a paddle member 156 as it moves around the lower sprocket wheels 142 onto the drive flight of the chains 144 and 146. Since the beets can no longer move around the housing 48, they will slide upwardly along a leading face of the helical flight 52 to the upper discharge opening in the housing 48. Since the elongated slot 130 provided in the housing 48 does not extend to the top of the housing 48, the upper portion of the housing 48 will be completely smooth with the exception of the discharge opening and therefore, as the conventional discharge paddle (undisclosed) at the upper end of the auger sweeps the material in the upper end of the housing about the housing wall to the discharge opening, the material will not be chewed up by any projections or disruptions in the auger housing.

Since the paddle members 156 extend at an angle with respect to the axis of rotation of the sprocket wheels 142 and since they also exit from the auger housing 48 in the general direction of rotation of the auger, they have an accelerated movement away from the material so that they will not cause a plugging condition in the auger conveyor at their point of exit.

From the foregoing description of a preferred embodiment of the invention and from the illustrations, it can be seen that the present invention provides an improved auger conveyor which is more efficient than previous auger conveyors and which will effectively convey material substantially vertically without requiring force feeding.

Although only a single preferred embodiment of the invention has been described and illustrated, various modifications within the spirit and scope of the invention will become apparent to those skilled in the art and can be made without departing from the underlying principles of the invention. Therefore, the invention should not be limited by the specific illustration and description but only by the following claims.

We claim:

1. Material conveying apparatus comprising: a rotatable auger inclined to the horizontal including an elongated core and a helical flight encircling and secured to the core; an elongated housing surrounding the auger; a pair of roller means mounted on the housing in spaced apart relationship along the length of the housing; endless flexible means trained about the roller means to present a pair of flights extending between the roller means; a plurality of paddles having opposite edges and a working side extending between the edges; and means securing the paddles to the endless flexible means for movement therewith and disposing at least a portion of the paddles on one flight of the endless flexible means within the confines of the helical flight with the opposite edges of each generally facing axially-spaced portions of the helical flight and the working side of each facing generally opposite to the direction of rotation of the auger to engage and prevent material on the flighting from gravitating on the helical flighting.

2. Apparatus as set forth in claim 1 wherein the roller means and endless flexible means are mounted exteriorly of the housing, the housing is provided with a longitudinal opening, and the paddles on the one flight of the endless flexible means extend through the opening provided in the housing.

3. Apparatus as set forth in claim 2 wherein an elongated housing for the endless flexible means is mounted on the exterior of the auger housing; the roller means are journaled in the housing for the endless flexible means adjacent the ends thereof, and the housing for the endless flexible means is provided with an elongated opening aligned with the opening in the auger housing.

4. Apparatus as set forth in claim 3 wherein each of said roller means includes a pair of spaced sprocket wheels fixed to a common shaft, the endless flexible means includes a pair of chains trained about the sprocket wheels, and each of the paddles has one end rigidly interconnected with one of the chains and an intermediate portion rigidly interconnected with the other of the chains.

5. Apparatus as set forth in claim 4 wherein each of the paddles is rigidly interconnected with the pair of chains by a bracket secured to the pair of chains and including a pair of legs projecting in planes parallel to the planes of the chains, the legs of each bracket are of unequal length, the one end of each paddle is connected to the shorter of the pair of legs of the respective bracket and the intermediate portion of each paddle is connected to the longer of the pair of legs of the respective bracket.

6. Apparatus as set forth in claim 5 wherein a pair of rollers are carried by each bracket and a pair of roller tracks are mounted in the housing for the endless flexible means to be engaged by the rollers carried by the brackets on the one flight of the endless flexible means.

7. Material conveying apparatus comprising: a rotatable auger inclined to the horizontal including an elongated core and a helical flight encircling and secured to the core and having axially-spaced portions; an elongated housing surrounding the auger; a pair of roller means mounted on the housing in spaced apart relation along the length of the housing; endless flexible means trained about the roller means to present drive and return flights extending between the roller means; a plurality of paddle members having opposite edges and a working side extending between the edges; and means securing the paddle members to the endless flexible means and disposing at least a portion of each of the paddle members on the drive flight of the endless flexible means between a pair of the axially-spaced portions of the helical flight with the opposite edges generally facing axially-spaced portions of the helical flight and the working side facing generally opposite to the direction of rotation of the auger to engage and prevent material on the flighting from gravitating on the helical flighting.

8. Material conveying apparatus as set forth in claim 7 wherein corresponding portions of adjacent paddle members are spaced apart a distance equal to corresponding surfaces of the axially spaced portions of the helical flight whereby the axially spaced portions of the helical flight will engage the paddle members on the drive flight of the endless flexible means upon rotation of the auger to drive the paddle members and endless flexible means.

9. Material conveying apparatus as set forth in claim 8 wherein each of the paddle members includes a drive roller positioned to move along the surface of the helical flight.

10. Material conveying apparatus as set forth in claim 7 wherein the roller means and endless flexible means are mounted exteriorly of the auger housing, the auger housing is provided with an elongated opening extending generally parallel to the axis of rotation of the auger, and the paddle members on the drive flight of the endless flexible means extends through the elongated opening in the auger housing and generally toward the center of the auger.

11. Material conveying apparatus as set forth in claim 10 wherein an elongated housing for the endless flexible means is secured to the exterior of the auger housing and is provided with an elongated opening in alignment with the elongated opening provided in the auger housing, and the roller means are journaled in the housing for the endless flexible means adjacent the opposite ends thereof.

12. Material conveying apparatus as set forth in claim 11 wherein each of the roller means includes a pair of sprocket wheels secured to a common shaft journaled in the housing for the endless flexible means, the endless flexible means includes a pair of chains trained about the sprocket wheels, each of the paddle members is a flat elongated paddle member having one end rigidly interconnected to one of the chains of the pair of chains, an intermediate portion rigidly interconnected to a second of the chains of the pair of chains, and a second end projecting away from the chains, and corresponding portions of adjacent paddle members are spaced apart a distance equal to corresponding surfaces of the axially-spaced portions of the helical flight whereby the axially-spaced portions of the helical flight will engage the paddle members on the drive flight of the endless flexible means upon rotation of the auger to drive the paddle members and the endless flexible means, and, as the spaced apart portions of the helical flight engage the paddle members on the drive flight of the endless flexible means to drive the paddle members and endless flexible means, the pair of chains counteract the forces exerted on the paddle members by the spaced apart portions of the helical flight to maintain the paddle members properly oriented.

13. Material conveying apparatus as set forth in claim 12 wherein each of the paddle members further includes a drive roller secured to its respective paddle member in position to engage and move along the helical flight when its respective paddle member is on the drive flight of the endless flexible means.

14. Material conveying apparatus as set forth in claim 12 wherein each of the paddle members is secured to the chains through a bracket having a pair of legs of unequal lengths, the long leg of the bracket is secured to the one of the chains and the short leg of the bracket is secured to the second of the chains whereby each of the paddle members extends outwardly at an angle to a plane formed by the respective flights of the pair of chains, the housing for the endless flexible means is rectangular-shaped in cross section and the elongated opening provided therein is adjacent one corner thereof, and the shafts for the sprocket wheels have opposite ends journaled on opposite walls of the housing for the endless flexible means in non-perpendicular relationship therewith so that the paddle members on the drive flights of the chains lie in a plane perpendicular to one end wall of the housing for the endless flexible means and project through the elongated openings provided in the two housings and the paddle members on the return flights of the chains extend into a corner of the housing for the endless flexible means.

15. Apparatus as set forth in claim 14 wherein each of the brackets carries a pair of guide rollers on its pair of legs, and a pair of tracks for the rollers on the drive flight of the endless flexible means are mounted in the housing for the endless flexible means.

16. Material conveying apparatus comprising: an elongated circular housing adapted to be positioned at an angle with respect to the horizontal; an auger journaled in the housing including a core and a helical flight secured to the core; the helical flight having a continuous leading material-engaging face having axially aligned portions spaced equal distances apart; a pair of roller means mounted exteriorly of the housing in spaced apart relationship along the length of the housing; endless flexible means trained about the roller means to present drive and return flights extending between the roller means; a plurality of paddle means each including a flat paddle member; means securing the paddle means to the endless flexible means in positions to have corresponding portions of adjacent paddle members spaced apart a distance equal to the axial spacing between the axially aligned portions of the helical flight and disposing each of the paddle members to have its sides lie in planes generally parallel to the axis of rotation of the auger when on the drive and return flights of the endless flexible means and when on the drive flight to extend through an elongated opening provided in the housing and between the axially-spaced portions of the helical flight whereby upon rotation of the auger, the paddle members on the drive flight of the endless flexible means will be engaged and driven in the direction of material movement and a working side of each will engage and prevent material being elevated on the leading face of the helical flight from gravitating on the continuous leading face of the helical flight.

17. Apparatus as set forth in claim 16 wherein each of the pair of roller means includes a pair of sprocket wheels mounted on a common shaft and operatively interconnected with each other for uniform rotation, the endless flexible means includes a pair of chains, and each of the paddle members is rigidly secured to both chains.

18. Apparatus as set forth in claim 17 wherein each of the paddle members has one end secured to one of the chains and an intermediate portion secured to a second of the chains, and a drive roller mounted thereon to engage and roll along the leading face of the helical flight upon rotation of the auger.

19. Apparatus as set forth in claim 18 wherein each of the paddle members is secured to the pair of chains by bracket means including a pair of legs secured to the chains, a pair of thrust rollers are mounted on the pair of legs, a secondary elongated housing is secured to the exterior of the auger housing and is provided with an elongated opening which registers with the elongated opening provided in the auger housing, the shafts for the sprocket wheels are mounted in the secondary housing adjacent the ends thereof, and a pair of thrust tracks are mounted in the secondary housing for engagement with the thrust rollers on the drive flights on the chains whereby engagement between the thrust tracks and thrust rollers prevents the force of material against the paddle members from moving the paddle members out of their normal planes.

20. Apparatus as set forth in claim 19 wherein the legs of each bracket means are of unequal lengths so that the paddle members on the drive and return flights of the chains lie in planes which converge away from the auger.

* * * * *